United States Patent

[11] 3,609,752

[72] Inventor Richard C. Grosser
c/o Industrial Data Reduction, 325 Chestnut St., Philadelphia, Pa. 19106

[21] Appl. No. 739,090
[22] Filed June 21, 1968
[45] Patented Sept. 28, 1971

[54] SIMULTANEOUS DATA ENCODER AND DECODER
12 Claims, 3 Drawing Figs.

[52] U.S. Cl. .......... 340/347 DD, 179/2 DP
[51] Int. Cl. .......... H03k 13/243
[50] Field of Search .......... 179/16 (.09), 84 (VF), 2 DP, 16, 45; 340/347

[56] References Cited

UNITED STATES PATENTS

| | | | |
|---|---|---|---|
| 3,076,059 | 1/1963 | Meacham et al. | 179/16 X |
| 3,087,999 | 4/1963 | Stewart et al. | 179/84 |
| 3,143,602 | 8/1964 | Morrison et al. | 179/84 |
| 3,187,107 | 6/1965 | Knight et al. | 179/16 |
| 3,231,675 | 1/1966 | Riddell | 179/16 X |
| 3,288,932 | 11/1966 | Cleary et al. | 179/2 |
| 3,299,210 | 1/1967 | Bandy | 179/2 |
| 3,381,276 | 4/1968 | James | 179/2 |
| 3,441,682 | 4/1969 | Pasternack | 179/84 |
| 3,470,532 | 9/1969 | Martens et al. | 179/84 |
| 3,475,557 | 10/1969 | Morse et al. | 179/2 |

*Primary Examiner*—Maynard R. Wilbur
*Assistant Examiner*—Gary R. Edwards
*Attorney*—Busser, Smith & Harding

ABSTRACT: Encoding circuitry, receiving combinations of pulses at input terminals, produces combinations of audio frequency tones at an output terminal. For certain characters, the combinations of tones are restricted to pairs of tones corresponding to the standard "touch-tones" used in telephone dialing. The tones produced in response to other characters are not so restricted. The same output terminal serves as an input terminal to a decoding circuit, which translates combinations of tones into direct current signals at a plurality of terminals. The decoding circuitry is disabled while tones are produced by the encoding circuitry.

INVENTOR
RICHARD C. GROSSER
BY Busser, Smith & Harding
ATTORNEYS

INVENTOR
RICHARD C. GROSSER
BY
Busser, Smith & Harding
ATTORNEYS

SIMULTANEOUS DATA ENCODER AND DECODER

BACKGROUND OF THE INVENTION

This invention relates to encoding and decoding circuits for use in conjunction with telephone lines for transmitting numerical and alphabetic data.

With the introduction of the "touch-tone" dialing system, in which pairs of tones chosen from seven available tone frequencies are used to designate digits of telephone exchanges, various systems have been devised for making use of combinations of these tones to transmit other data besides telephone exchanges. For example, in my copending application, Ser. No. 689,575, filed Dec. 11, 1967, now abandoned, there is disclosed a relatively simple tone generator, which may be coupled to a telephone line acoustically, and which may be used to generate tones, pairs of which may be used to transmit numerical information to computer inputs and to off-line data storage apparatus, from a manual keyboard. Other systems have been devised for transmitting various kinds of data including numerical and alphabetic data, over telephone lines, in which each character of information is transmitted by tones produced in a particular time sequence for each character. For example, in a conventional binary transmission system, a single tone frequency, or a pair of tone frequencies can be used to transmit any number of characters if the coded sequence of tones takes up a sufficiently long period of time. This is the system conventionally used for teletype transmission, and it will be apparent that, not only is its speed of operation limited, but simultaneous two-way transmission of data using the same tones is not practical because of the long time required to transmit a single character.

SUMMARY OF THE INVENTION

In accordance with this invention, each character to be transmitted is represented by a plurality of pulses occupying the same period of time; i.e., parallel pulses. At a single terminal, a plurality of tone frequencies is produced, the tones occurring simultaneously, and the combination of tone frequencies representing the character being transmitted. By this method, characters can be transmitted at comparatively high speeds, yet an interval exists between the transmissions of characters during which tone signals can be received at this same terminal, and can be transformed into parallel pulses, which can be recorded. The parallel pulses at the input of the apparatus, and these produced at its output are coded in binary-coded decimal (BCD) form.

The apparatus in accordance with the invention makes use of the standard "touch-tone" frequencies to transmit both numerical and alphabetic information. For numerical information, pairs of tones are produced in the same combinations as used in "touch-tone" dialing so that automatic dialing of a telephone exchange can be effected by numerical information received at the input of the apparatus. The same tones are used, but in different combinations, to transmit alphabetic data received at the input terminals.

The apparatus comprises encoding circuitry for transmitting data, and decoding circuitry for translating received ones into pulses, in binary-coded decimal form. The decoding circuitry produces output pulses in binary-coded decimal form, whether or not the received tones are coded in the standard "-touch-tone" code or in binary-coded decimal form.

The term "numerical information," as used herein refers to the digits 0 through 9, and also to symbols such as * and ◇. These symbols may be used, for example, to indicate that previously transmitted data is erroneous and to effect its correction by subsequently transmitted data.

While the apparatus is described particularly with reference to its use in conjunction with telephones lines, it will be apparent that it may, as well, be used in conjunction with radio transmission, the tones produced by the encoding apparatus being used to modulate a radio frequency signal.

DESCRIPTION OF THE PREFERRED EMBODIMENT

Figure 1:
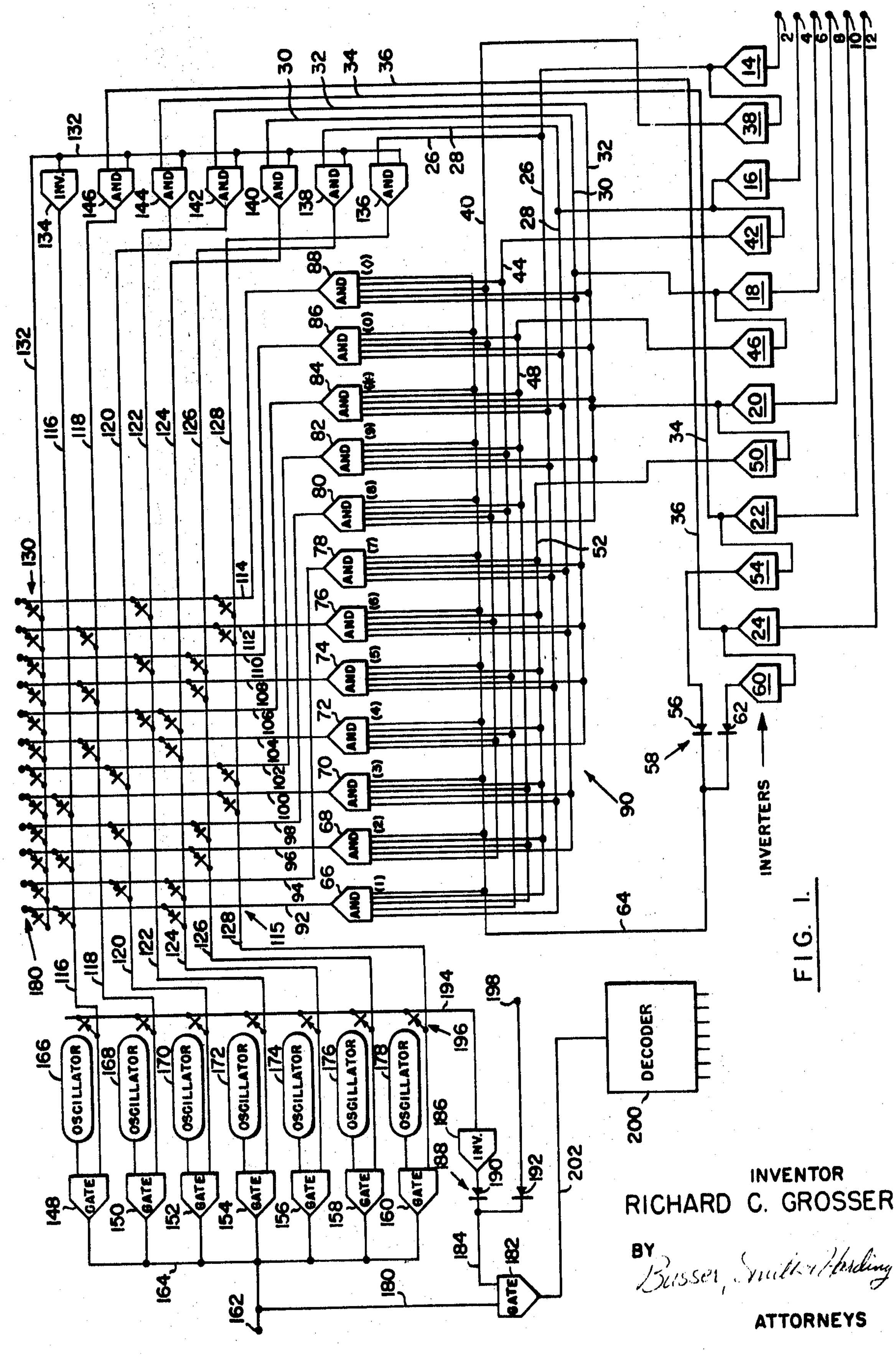
FIG. 1 is a schematic diagram of the encoding portion of the circuit showing various elements in block form.

Referring first to FIG. 1, terminals 2, 4, 6 and 8, along with terminals 10 and 12 are arranged to receive positive-going pulses from a suitable source, for example, a tape reader or a teletype machine connected online. The pulses received at these terminals will represent information coded in standard six bit binary-coded decimal (BCD) form. The following table indicates the nature of the code, and the terminals which will be energized in response to various units of numerical or alphabetic information.

| Character | Terminals | | | | | |
|---|---|---|---|---|---|---|
| | 12 | 10 | 8 | 6 | 4 | 2 |
| 0 | 0 | 0 | 1 | 0 | 1 | 0 |
| 1 | 0 | 0 | 0 | 0 | 0 | 1 |
| 2 | 0 | 0 | 0 | 0 | 1 | 0 |
| 3 | 0 | 0 | 0 | 0 | 1 | 1 |
| 9 | 0 | 0 | 1 | 0 | 0 | 1 |
| * | 0 | 0 | 1 | 0 | 1 | 1 |
| ◇ | 0 | 0 | 1 | 1 | 0 | 0 |
| A | 1 | 1 | 0 | 0 | 0 | 1 |
| B | 1 | 1 | 0 | 0 | 1 | 0 |
| C | 1 | 1 | 0 | 0 | 1 | 1 |
| J | 1 | 0 | 0 | 0 | 0 | 1 |
| K | 1 | 0 | 0 | 0 | 1 | 0 |
| L | 1 | 0 | 0 | 0 | 1 | 1 |
| S | 0 | 1 | 0 | 0 | 1 | 0 |
| T | 0 | 1 | 0 | 0 | 1 | 1 |
| U | 0 | 1 | 0 | 1 | 0 | 0 |

Each of terminals 2 through 12 is connected to the input of an inverter of the group of inverters 14, 16, 18, 20, 22 and 24. The output of inverter 14 is connected to line 26. The output of inverter 16 is connected to line 28. The output of inverter 18 is connected to line 30. The output of inverter 20 is connected to line 32. The output of inverter 22 is connected to line 34. The output of inverter 24 is connected to line 36.

An inverter 38 receives the output of inverter 14 and delivers its output to line 40. Inverter 42 receives the output of inverter 16 and delivers its output to line 44. Inverter 46 receives the output of inverter 18, and delivers its output to line 48. Inverter 50 receives the output of inverter 20, and delivers its output to line 52. An inverter 54 receives the output of inverter 22, and delivers its output to a diode 56, which forms part of an OR gate indicated generally at 58. Inverter 60 receives the output of inverter 24, and delivers its output to diode 62, and thus to the other input of OR gate 58. The output of OR gate 58 is connnected to line 64.

AND gates 66 through 88 are five input AND gates, and each of these AND gates produces an output only when none of its input terminals is energized. The inputs of these AND gates are interconnected with the lines described above with the exception of lines 34 and 36 by interconnections indicated generally at 90. These interconnections, and the operations of the various AND gates in response to signals appearing at terminals 2 through 12 will be best understood by reference to several examples.

According to the code shown in the above table, zone bits are zero only for numerical information; i.e., for digits 0 through 9 and "star" and "diamond." When a zone bit appears at one or both of terminals 10 and 12, OR gate 58 will receive at least one input, and line 64 will be energized, thus disabling all of gates 66 through 88.

Assuming, however, that a coded numeral "9" appears at the input terminals, only terminals 2 and 8 will be energized. By the operation of the inverters, the result is that the energized lines will be lines 40, 28, 30, 52, 34 and 36. The unenergized lines will be lines 26, 44, 48, 64 and 32. Only AND gate 82 is connected to the lines in such a way that none of its inputs is connected to an energized line. Consequently, only AND gate 82 produces an output when a coded 9 appears at input terminals 2 through 12.

A similar analysis is possible for all of the combinations of energized input terminals which will result from the appearance of coded numerals, and it will be apparent that the outputs of AND gates 66 through 88 will be energized individually, each of these AND gates corresponding to the Figure indicated next to it in parentheses. Gate 86 corresponds to the binary representation for 10, and its output is energized when input terminals 8 and 4 are energized. The binary representation 1010 must be used to represent a zero, since none of the AND gates 66 through 88 can be permitted to be energized when all of the input terminals are unenergized during the interval between readings.

The outputs of AND gates 66 through 88 are delivered through lines 92 through 114 to a diode array indicated generally at 115. Each line of lines 92 through 114 is connected, through the diode array, to a pair of lines comprising one of lines 116, 118, 120 and 122, and one of lines 124, 126 and 128. The outputs of AND gates 66 through 88 are thus translated into a "2 of 7" code by the diode array.

Each diode of an additional set of diodes 130 connects one of lines 92 through 114 to line 132, which is connected to the input of inverter 134. The output of inverter 134 is fed to line 116. In addition, a connection is made from line 132 to one input of each of AND gates 136 through 146. These AND gates are two-input gates and provide outputs only when both input terminals are unenergized. AND gate 136 receives an input from the output of inverter 14 through line 26. The remaining AND gates 138 through 146 receive their inputs from the outputs of inverters 16, 18, 20, 22 and 24 respectively.

The two systems of AND gates so far described operate in a mutually exclusive fashion. That is, when the output of any one of AND gates 66 through 88 is energized, a signal will be transmitted through one of diodes 130, and through line 132 to energize one input of each of AND gates 136 through 146. Thus, AND gates 136 through 146 cannot produce outputs at this time. On the other hand, when none of AND gates 66 through 88 produces an output, AND gates 136 through 146 are enabled. Enabling of AND gates 136 through 146 will necessarily occur when pulses corresponding to zone bits appear at one or both of terminals 10 and 12, since these pulses will cause energization of line 64, which disables AND gates 66 through 88.

From the foregoing, it will be apparent that, where no zone bits are present, the pulses appearing at the input terminals 2 through 8 will be translated into a "2 of 7" code in lines 116 through 128, while, if zone bits are present, the signals appearing in lines 118 through 128 will be in a binary decimal code corresponding to the code at input terminals 2 through 12. In addition, when zone bits are present, line 116 will be energized by the output of inverter 134, since its input will be necessarily zero.

Seven linear gates 148, 150, 152, 154, 156, 158 and 160 are arranged to receive control inputs from lines 116 through 128, respectively. These linear gates are of a type capable of controlling the passage of an audio frequency signal, the audio signal being passed only when a control signal is present at the control input. The Fairchild 914 gate is suitable for this purpose. The outputs of gates 148 through 160 are connected in common through output terminal 162 through line 164.

Seven oscillators 166, 168, 170, 172, 174, 176 and 178 are arranged with their outputs connected respectively to the inputs of linear gates 148 through 160. These oscillators are desirably of the phase shift type, and desirably employ an automatic gain control network for stability. Fairchild 702–A high-gain, wide-band DC amplifiers, connected as oscillators are suitable. Each oscillator is adjusted to produce one of the seven standard "touch-tone" frequencies. Oscillator 166 produces an output at 697 Hz.; oscillator 168 produces 770 Hz.; oscillator 170 produces 852 Hz.; oscillator 172 produces 941 Hz.; oscillator 174 produces 1,209 Hz.; oscillator 176 produces 1,336 Hz. and oscillator 178 produces a frequency of 1,477 Hz.

In operation, when no zone bits are present at input terminals 10 and 12, pulses at input terminals 2 through 8 corresponding to numerical information, will cause the production of pairs of tones at terminal 162. One of the tones of the pair will be one of the following frequencies: 697 Hz.; 770 Hz.; 852 Hz. and 941 Hz. The other tone will be at one of the following frequencies: 1,209 Hz.; 1,336 Hz. and 1,477 Hz. Terminals 180 are provided, each being connected to one of lines 92 through 114, for connection to an optional numeric keyboard, by which any of lines 92 through 114 can be energized independently of the circuitry receiving inputs from terminals 2 through 8. Energization of any one of terminals 180 will likewise result in the production of a pair of tones.

The correspondence of tone frequencies to numerical digits is shown by the following table:

| Character | Tone frequencies (Hz.) | | | | | | |
|---|---|---|---|---|---|---|---|
| | 697 | 770 | 852 | 941 | 1209 | 1336 | 1477 |
| 0 | | | | X | | X | |
| 1 | X | | | | X | | |
| 2 | X | | | | | X | |
| 3 | X | | | | | | X |
| 4 | | X | | | X | | |
| 5 | | X | | | | X | |
| 6 | | X | | | | | X |
| 7 | | | X | | X | | |
| 8 | | | X | | | X | |
| 9 | | | X | | | | X |
| * | | | | X | X | | |
| ◇ | | | | X | | | X |
| A | X | X | X | | | | X |
| B | X | X | X | | | X | |
| C | X | X | X | | | X | X |
| J | X | X | | | | | X |

When zone bits are present, however, the combinations of tones produced at terminal 162 are completely different. The 697 Hz. tone will be present whenever a signal including the zone bits appears at terminals 2 through 12. This 697 Hz. tone serves as a check to determine the mode in which the device is operating. Any number of the remaining tones may be produced at terminal 162, when the device is operating in the alphabetic mode. It will be apparent, however, that no pair of tones as defined above for numerical information will be produced for alphabetic information. This is true because, since at least one zone bit is present for this unit of alphabetic information, at least one of lines 120 and 124 will be energized in addition line 116 (energized through inverter 134), so that at least two of the frequencies: 697 Hz.; 778 Hz.; 852 Hz. and 941 Hz. will be present. For numerical information, this is not true.

Terminal 162, in a typical installation, will be coupled, either directly, acoustically or inductively to a telephone line. Terminal 162 serves not only to deliver the output of the encoding circuitry in FIG. 1 to the telephone line, but also serves to receive combinations of tones from the telephone line. Line 180 delivers all of the signals, appearing at terminal 162 to the input of linear gate 182. Gate 182 is of the same type as gates 148 through 160. Its control input at line 184 is derived from inverter 186 through an OR gate 188 comprising diodes 190 and 192. Inverter 186, in turn, receives its input from line 194, which is connected to each of lines 116 through 128 through a diode of the group of diodes comprising a seven-input OR gate indicated generally at 196. A second input may be delivered to OR gate 188 at diode 192 from terminal 198.

The output of linear gate 182 is delivered to a decoder 200, which will be more fully described below, through line 202. The function of gates 182, 188, 186 and 196 is to prevent decoder 200 from receiving tones produced by oscillators 166 through 178, while it is permitted to receive tones received at terminal 162 from the telephone line. Whenever at least one of lines 116 through 128 is energized, the signal in line 194, delivered to inverter 186, causes linear gate 182 to be disabled. Disabling of gate 182 will occur only momentarily, that is, while tones are being produced by the circuitry in FIG. 1. During the interval between the production of tones gate 182 is enabled to transmit received signals to the decoder. Thus, a simultaneous transmission and reception of information is possible. If it is desired to cause the decoder 200 to receive signals produced by oscillators 166 through 178, a positive direct current voltage can be applied to terminal 198, which will enable linear gate 182 continuously.

Figure 3:
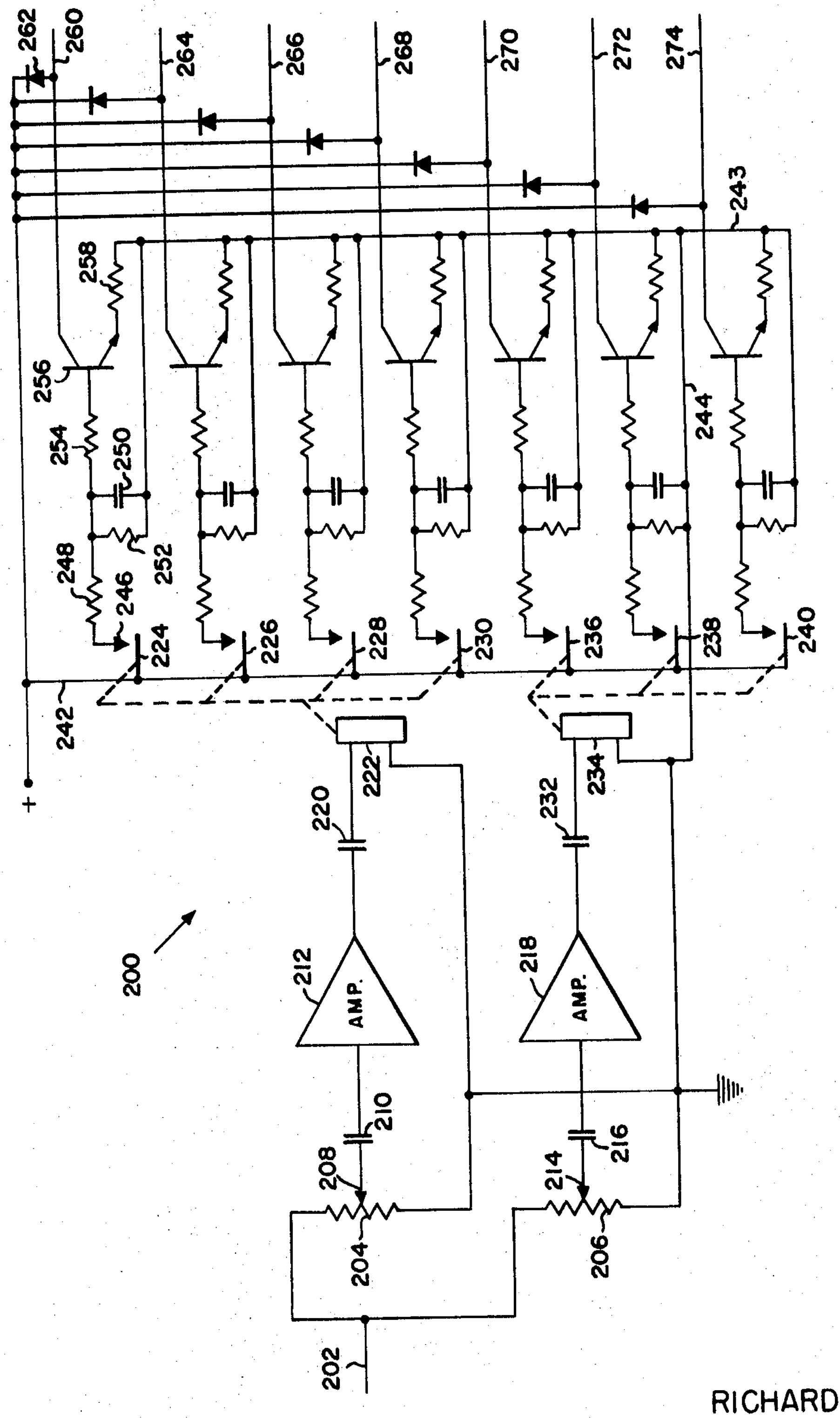
FIG. 3 is a schematic diagram showing the details of the decoder shown in block form in FIGS. 1 and 2.

The decoder 200 is shown in detail in FIG. 3. Input line 202 is connected through a pair of variable resistors 204 and 206 to ground. Wiper 208 of resistor 204 is connected through capacitor 210 to the input of amplifier 212. Amplifier 212 may be any conventional audio amplifier having a flat response for frequencies between 687 Hz., and 941 Hz. Wiper 214 of resistor 206 is connected through capacitor 216 to the input of amplifier 218, which, likewise may be any conventional audio amplifier having a flat response between 1209 Hz. and 1477 Hz. The output of amplifier 212 is delivered through capacitor 220 to the energizing coil 222 of a resonant reed relay comprising vibrating reeds 224, 226, 228 and 230. These reeds are resonant at 697 Hz., 770 Hz., 852 Hz. and 941 Hz., respectively. The output of amplifier 218 is connected through capacitor 232 to energizing coil 234 of a resonant reed relay comprising reeds 236, 238 and 240, which resonate at 1,209 Hz., 1,336 Hz., and 1,477 Hz., respectively. All of the reeds are connected to a positive direct current supply through line 242.

Line 243 is grounded through line 244. Reed 244 is provided with a contact 246, connected through resistor 248 and capacitor 250 to ground line 243. Resistor 252 is provided in shunt with capacitor 250, and resistor 254 connects the ungrounded side of capacitor 250 to the base of transistor 256. The emitter of transistor 256 is connected through resistor 258 to ground, and its collector is connected to line 260. Diode 262 connects line 260 to the positive supply terminal. Each of the remaining reeds is similarly associated with one of lines 264, 266, 268, 270, 272 and 274.

Figure 2:
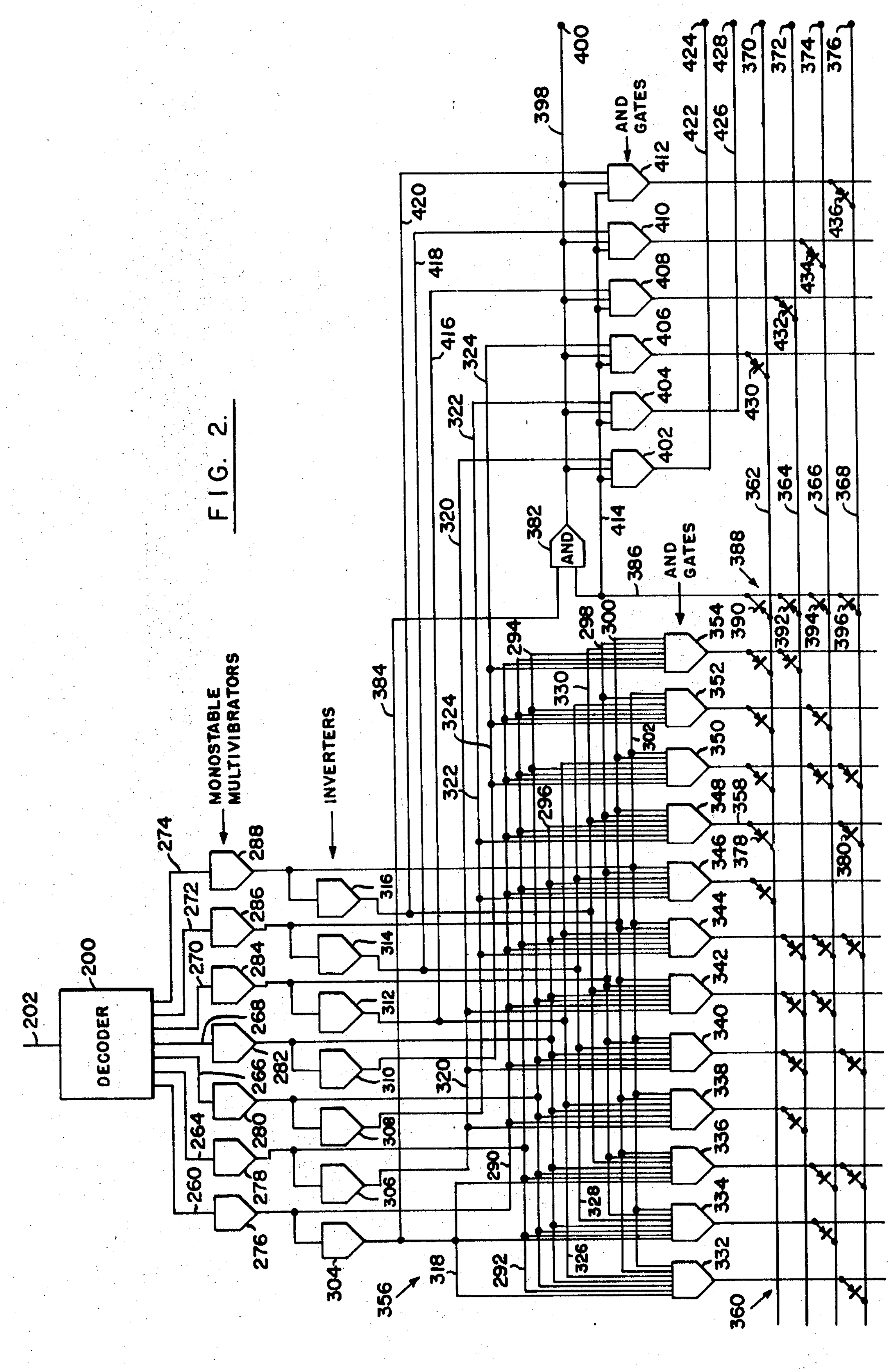
FIG. 2 is a schematic diagram of the decoding portion of the circuit.

In operation, taking the circuitry associated with reed 224 as an example, when reed 224 vibrates, current from the positive supply terminal changes capacitor 250 through resistor 248. Simultaneously, capacitor 250 tends to become discharged through resistor 252. Capacitor 250 acts as an integrator, integrating the intermittent pulses supplied to it as a result of reed vibrations, and provides a positive signal at the base of transistor 256 during vibrations of reed 224. When the base of transistor 256 becomes positive, it conducts, allowing a current flow through line 260 from a source of a positive bias contained in the circuitry of monostable multivibrator 276 (FIG. 2). The circuitry associated with the remaining reeds provides current flow in the remaining lines of lines 260, 264, 266, 268, 270, 272, and 274, these current paths corresponding to the appearance of tone frequencies at the resonant frequencies of the corresponding reeds.

Referring now to FIG. 2, decoder 200 is shown with each of its output lines connected to the input of one of monostable multivibrators 276, 278, 280, 282, 284, 286 and 288. These multivibrators are of conventional type, and are capable of converting the positive-going signals in the output lines of decoder 200 into regular pulses of constant duration and amplitude. The output of multivibrator 276 is connected to line 290. The output of multivibrator 278 is connected to line 292. The output of multivibrator 280 is connected to line 294. The output of multivibrator 282 is connected to line 296. The output of multivibrator 284 is connected to line 298. The output of multivibrator 286 is connected to line 300, and the output of multivibrator 288 is connected to line 302.

Each of the outputs of the multivibrators has connected to it the input of one of inverters 304, 306, 308, 310, 312, 314 and 316. The output of inverter 304 is connected to line 318. The output of inverter 306 is connected to line 320. The output of inverter 308 is connected to line 322. The output of inverter 310 is connected to line 324. The output of inverter 312 is connected to line 326. The output of inverter 314 is connected to line 328 and the output of inverter 316 is connected to line 330.

The lines just described constitute part of the interconnections between the outputs of the monostable multivibrators 276 through 288 and inverters 304 through 316 with the inputs of twelve seven-input AND gates 332 through 354. The interconnections are indicated generally at 356, and are such that only one of AND gates 332 through 354 produces an output when a pair of tones appears at the input line 202 of decoder 200, which correspond to a numerical character. If any other combination of tones is present, none of AND gates 332 through 354 will produce an output.

Taking as an example the numerical character "9," it will be seen from the second of the above tables that it corresponds to a pair of tones having frequencies of 852 Hz. and 1,477 Hz. Only lines 266 and 274 at the output of decoder 200 will be energized. From an examination of interconnections 356, it will be apparent that lines 302, 328, 326, 294, 324, 320 and 318 will be energized. Each of AND gates 332 through 354 except AND gate 348 has at least one input connected to at least one of these energized lines. Lines 300, 298, 330, 296, 292, 290 and 322, from which AND gate 348 receives its seven inputs, are unenergized. The result is that a positive signal appears in the output line 358 of AND gate 348.

It will also be apparent that the only condition under which any of AND gates 332 through 354 can produce an output is the condition in which one of lines 260, 264, 266 and 268 is energized, and one of lines 270, 272 and 274 is energized. If none of these lines is energized, each of AND gates 332 through 354 receives an output of at least one of the inverters 304 through 316. If only one, or more than two of the output lines of decoder 200 are energized, at least one input of each of AND gates 332 through 354 will be energized, with the result that all of these AND gates will be disabled. All of the AND gates will likewise be disabled, even though a pair of tones is present, if the pair of tones does not correspond to a character of numerical information; that is, if more than one of lines 260, 264, 266 and 268 is energized, or if more than one of lines 270, 272 and 274 is energized.

A diode network indicated generally at 360 interconnects the outputs of AND gates 332 through 354 with lines 362, 364, 366 and 368, leading respectively to output terminals 370, 372, 374 and 376. The diodes in network 360 are so arranged that a different combination of terminals 370 through 376 is energized for each character of numerical information. For example, diodes 378 and 380 connect line 358 to terminals 370 and 376 respectively so that those terminals are energized when a pair of tones appears in line 202 corresponding to the numerical character "9."

A two-input AND gate 382 receives a first input through line 384 from the output of inverter 304. Its second input is derived, through line 386 from the output of an OR gate 388 comprising diodes 390, 392, 394, and 396, each receiving an input from one of lines 386, 366, 364 and 362. AND gate 382 produces an output in line 398 only when line 260 at the output of decoder 200 is energized simultaneously with a condition in which none of AND gates 332 through 354 is producing an output. Since a signal will appear in line 260 whenever the apparatus is operating in the alphabetic mode, AND gate 382 provides a check against error by providing an output at terminal 400 whenever lines 384 and 386 are simultaneously unenergized.

Six three-input AND gates 402, 404, 406, 408, 410 and 412 are provided, each receiving an input directly from line 386 through line 414, and each receiving a second input from the output of AND gate 382 through line 398. AND gate 402 receives its third input through line 320 from the output of inverter 306. AND gate 404 receives its third input through line 322 from the output of inverter 308. AND gate 406 receives its third input through line 324 from the output inverter 310.

AND gate 408 receives its third input through line 416 from the output of inverter 312. AND gate 410 receives its third input through line 418 from the output of inverter 314. AND gate 412 receives its third input through line 420 from the output of inverter 316.

The output of AND gate 402 is delivered through line 422 to terminal 424. The output of AND gate 404 is delivered through line 426 to terminal 428. The output of AND gate 406 is connected through diode 430 to terminal 370; the output of AND gate 408 is connected through diode 432 to terminal 372; the output of AND gate 410 is connected through diode 434 to terminal 374; and the output of AND gate 412 is connected through diode 436 to terminal 376.

In the operation of the circuit shown in FIG. 2, alphabetic information is processed directly by AND gates 402 through 412. Zone bits occupy terminals 424 and 428, while the remaining bits occupy terminals 370 through 376. AND gate 382 produces a signal at terminal 400 and simultaneously disables AND gate 402 through 412 whenever the 697 Hz. tone is not present during operation in the alphabetic mode.

Terminals 424, 428, 370, 372, 374 and 376 may be connected to the input of any suitable information storage apparatus, or to the input of a teletype machine or any other suitable printout device.

Viewing the apparatus as a whole, it will be seen that it is capable of transmitting and receiving numerical and alphabetic information simultaneously through a single connection 162 (FIG. 1) to a telephone line. Although a single connection at 162 may be used, it is also possible to provide separate lines for transmission and reception. The circuitry which disables the decoding portion of the device during transmission by the encoding portion should still be used if there is any possibility that transmitted tones could be fed back into the line provided for reception.

Further, in conjunction with the touch-tone dialing system, the apparatus will be seen to be capable of effecting automatic connection to a desired telephone exchange, which may be recorded on a tape or other memory, which may be connected to produce signals at input terminals 2 through 12. This gives rise to the possibility of automatic interconnection between computer memories in which the need for dialing a telephone exchange by a human attendant can be entirely eliminated.

It will be apparent that various modifications may be made to the invention described herein without departing from its scope as defined in the following claims.

1. In combination, means providing a first plurality of terminals capable of being energized selectively, means producing a plurality of alternating electrical signals each of said signals being at a different frequency from the frequency of each of the others of said signals, an output terminal, means responsive to energization of said terminals of said first plurality of terminals for selectively delivering signals of said plurality of electrical signals to said output terminal, means having an input for receiving electrical signals comprising combinations of signals at different frequencies, a second plurality of terminals, and means selectively energizing terminals of said second plurality in response to the signals received at said input to said means for receiving electrical signals, wherein the improvement comprises means preventing said means for selectively energizing terminals of said second plurality from energizing said terminals of said second plurality, when said means for selectively delivering signals is delivering signals to said output terminals.

2. The combination according to claim 1 in which said preventing means includes a controllable gate receiving said electrical signals comprising combinations of signals at different frequencies and delivering said signals to said input, and means controlling delivery by said gate and responsive to energization of terminals of said first plurality to prevent said gate from delivering signals to said input when signals are delivered to said output terminal.

3. In combination, a group of selectively energizable terminals, at least one additional energizable terminal, means producing a plurality of alternating electrical signals, each of said signals being at a different frequency from the frequency of each of the others of said signals, an output terminal and means responsive to energization of terminals in said group for selectively delivering combinations of signals of said plurality to said output terminal when no said additional terminal is energized, each of said combinations of signals corresponding to a different combination of energized terminals, means responsive to energization of said additional terminal for selectively delivering combinations of said signals to said output terminal in response to energization of said terminals of said group, the combinations of signals delivered to said output terminal when said additional terminal is energized being different from the combinations of signals delivered to said output terminal when no said additional terminal is energized, said means responsive to energization of terminals in said group including means delivering pairs of said signals to said output terminal in response to energization of said terminals in said group when no said additional terminal is energized, and means responsive to energization of said additional terminal for delivering a combination of at least two of said group are energized, and including means delivering a predetermined one of said signals to said output terminal whenever said additional terminal is energized.

4. In combination, an input terminal for receiving combinations of electrical signals at different frequencies, a group of output terminals, at least one additional output terminal, means for selectively energizing said output terminals of said group in response to reception of a first group of combinations of electrical signals at said input terminal, the last-mentioned means energizing a different combination of said output terminals of said group for each of said combinations of signals received at said input terminal, and means responsive to reception of a second group of combinations of electrical signals different from said first group at said input terminal for selectively energizing combinations of said output terminals of said group different from the combinations of output terminals of said group energized in response to said first group of combinations of said signals, said means responsive to reception of a second group of combinations of electrical signals also energizing said additional output terminal, and said means for selectively energizing said output terminals of said group in response to reception of a first group of combinations of electrical signals at said input terminals including first gate means producing an output only when the signals received at said input terminal comprise signals at a pair of said frequencies and second gate means receiving the output of said first gate means and selectively energizing said output terminals of said group only when said first gate means produces an output.

5. In combination, an input terminal for receiving combinations of electrical signals at different frequencies, a group of output terminals, at least one additional output terminal, means for selectively energizing said output terminals of said group in response to reception of a first group of combinations of electrical signals at said input terminal, the last-mentioned means energizing a different combination of said output terminals of said group for each of said combinations of signals received at said input terminal, and means responsive to reception of a second group of combinations of electrical signals different from said first group at said input terminal for selectively energizing combinations of said output terminals of said group different from the combinations of output terminals of said group energized in response to said first group of combinations of said signals, said means responsive to reception of a second group of combinations of electrical signals also energizing said additional output terminal, and said means responsive to reception of a second group of combinations of electrical signals including means responsive to reception of a signal at said input terminal at a particular frequency, for preventing energization of said output terminals of said group in response to said second group of combinations of said signals unless said particular frequency is present at said input terminal.

6. In combination, an input terminal for receiving combinations of electrical signals at different frequencies, a group of output terminals, at least one additional output terminal, means for selectively energizing said output terminals of said group in response to reception of a first group of combinations of electrical signals at said input terminal, the last-mentioned means energizing a different combination of said output terminals of said group for each of said combinations of signals received at said input terminal, and means responsive to reception of a second group of combinations of electrical signals different from said first group at said input terminal for selectively energizing combinations of said output terminals of said group different from the combinations of output terminals of said group energized in response to said first group of combinations of said signals, said means responsive to reception of a second group of combinations of electrical signals also energizing said additional output terminal, and including a second additional terminal and means responsive to absence of a signal at said input terminal at a particular frequency and simultaneous absence at said input terminal of electrical signals of said first group of combinations for producing an output signal at said second additional terminal.

7. In combination: a group of selectively energizable terminals, an output terminal, means for producing a plurality of alternating electrical signals, each at a different frequency, first means connected to said energizable terminals for effecting delivery to said output terminal from said producing means of a combination of said electrical signals in a first predetermined relationship such that one of said electrical signal is delivered for each terminal in said group which is energized, and second means connected to said energizable terminals for recognizing a predetermined limited number of combinations of energized terminals in said group, nullifying the operation of said first means when one of said predetermined combinations appears, and including code translating means for effecting delivery, to said output terminal in response to said predetermined combinations, of combinations of said electrical signals in a second predetermined relationship different as a whole from said first predetermined relationship.

8. The combination according to claim 7 in which the combinations, the delivery of which is effected by said code translating means are pairs of said electrical signals.

9. The combination according to claim 7 including means for delivering a predetermined one of said electrical signals to said output terminal whenever said first means is in operation.

10. In combination: an input terminal for receiving combinations of electrical signals at different predetermined frequencies, a plurality of output terminals, first means responsive to the signals at said input terminal for energizing a combination of said output terminals in a first predetermined relationship such that one of said output terminals is energized for each frequency of a predetermined group of frequencies at said input terminal, and second means responsive to the signals at said input terminal for recognizing a predetermined limited number of combinations of frequencies at said input terminal, nullifying the operation of said first means when one of said predetermined combinations of frequencies appears and including code translating means for effecting energization of combinations of said output terminals in response to said predetermined combinations in a second predetermined relationship different as a whole from said first predetermined relationship.

11. The combination according to claim 10 in which said second means is arranged to recognize and respond to predetermined pairs of frequencies.

12. The combination according to claim 10 including means responsive to a predetermined one of said frequencies for preventing operation of said first means unless said predetermined one of said frequencies is present at the input terminal.